Nov. 19, 1968  R. W. COOK  3,411,644
BOAT LOADER AND CARRIER
Filed July 7, 1966  4 Sheets-Sheet 4
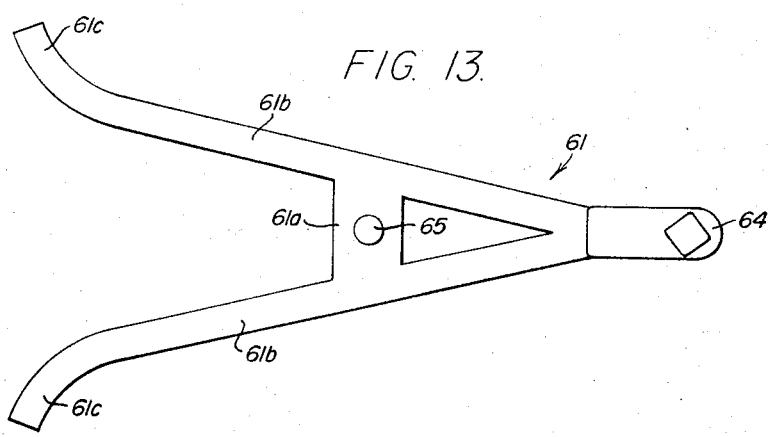
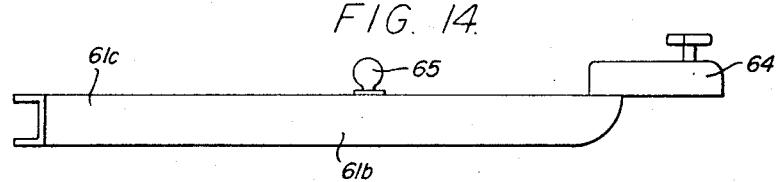
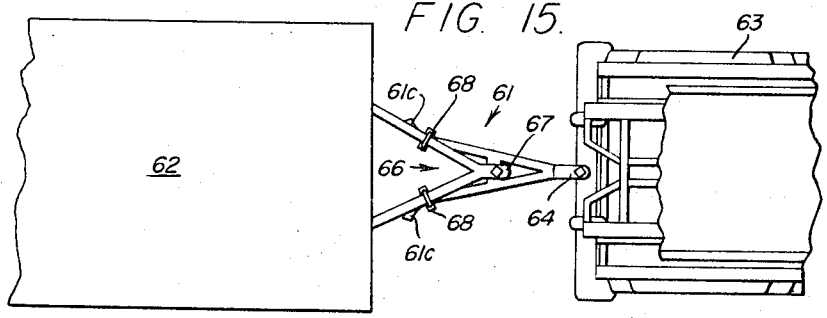
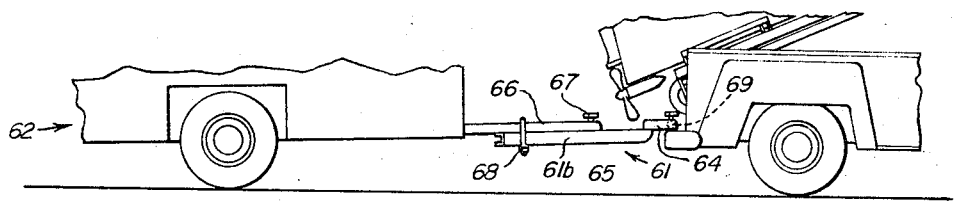
INVENTOR.
ROY W. COOK
BY
MALLINCKRODT & MALLINCKRODT
ATTORNEYS

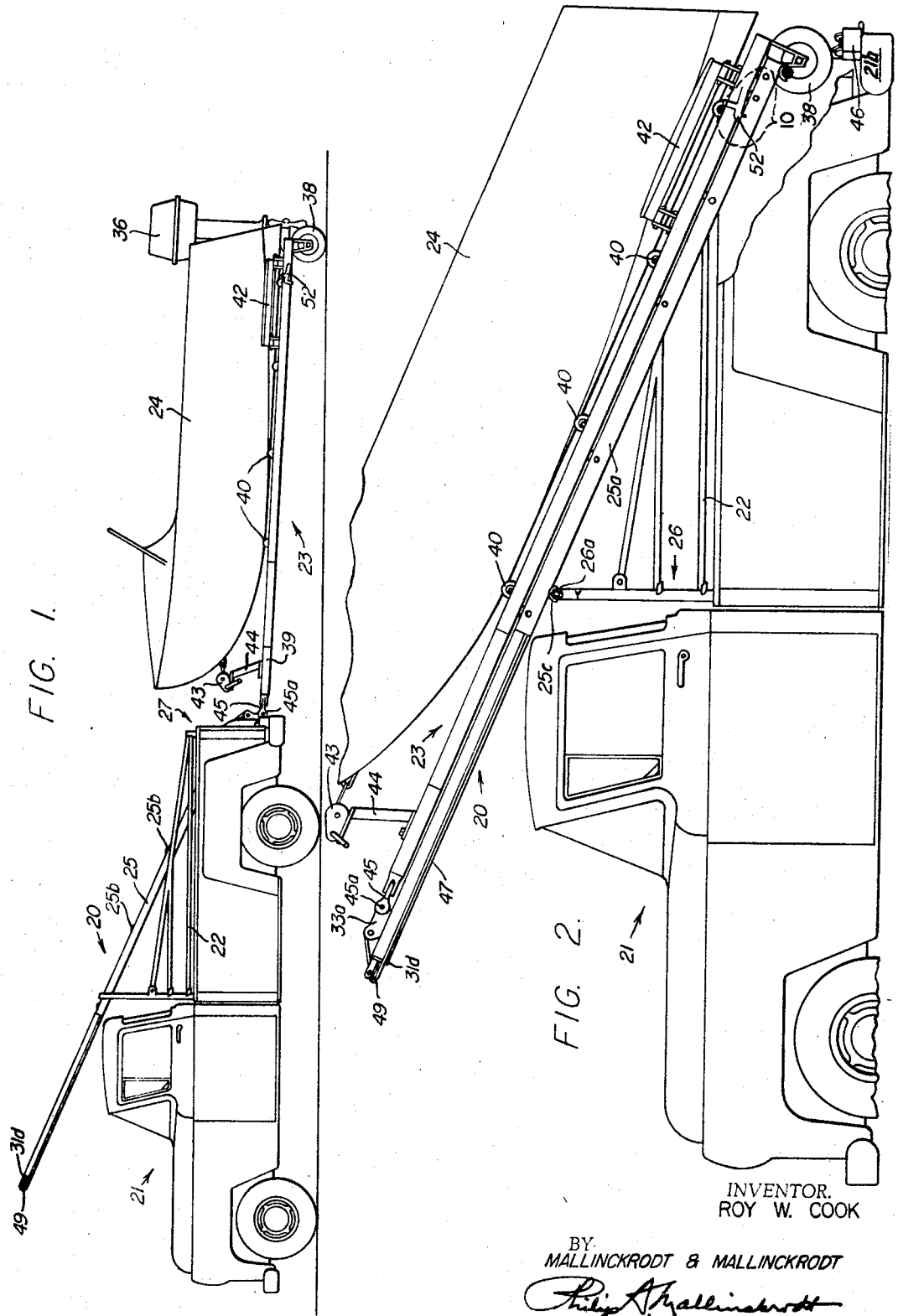

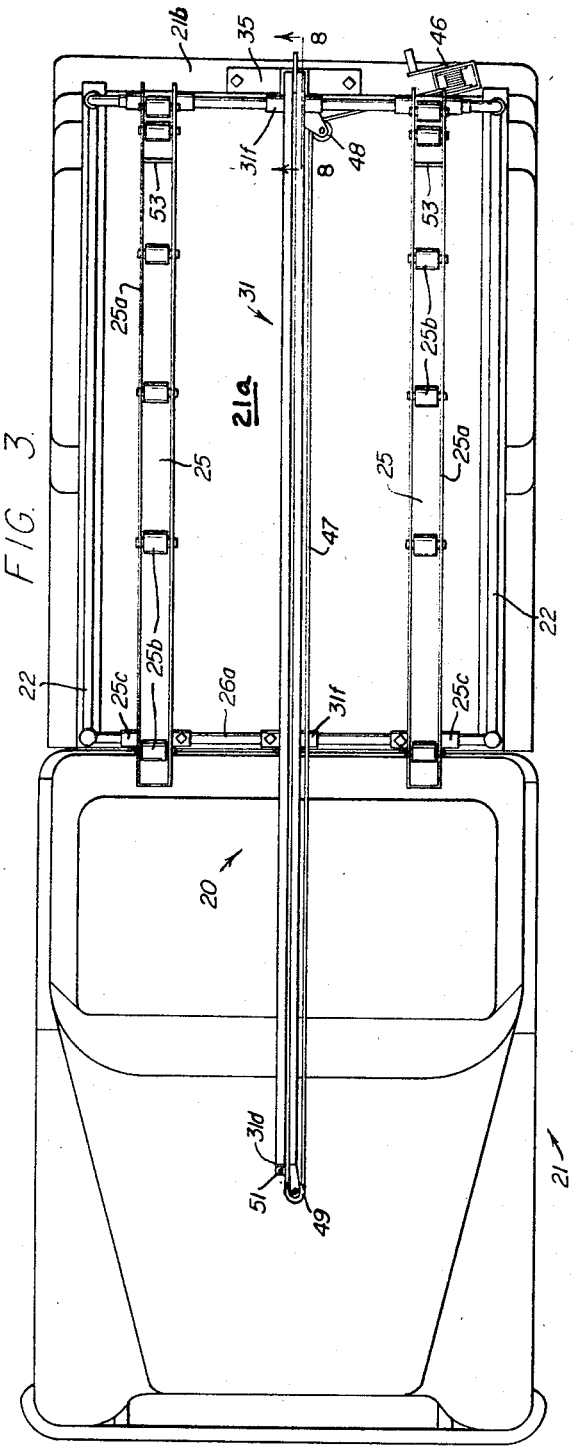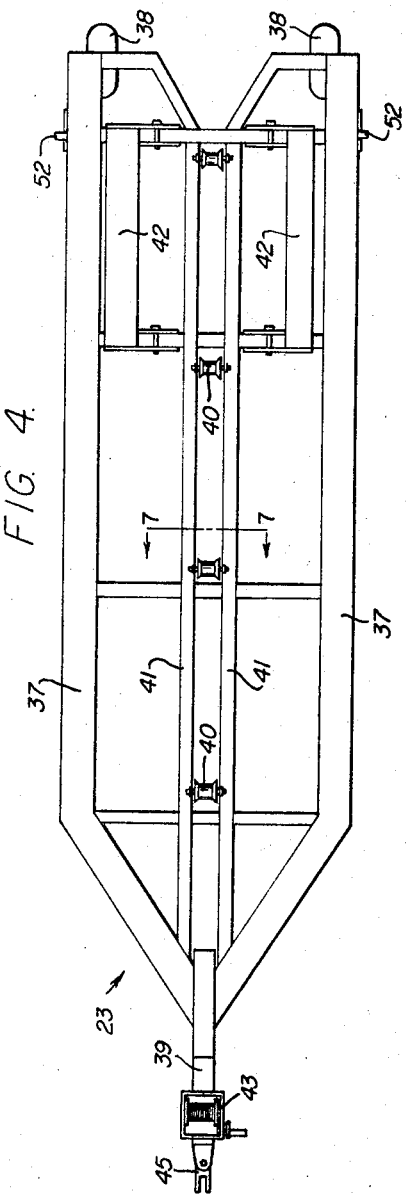

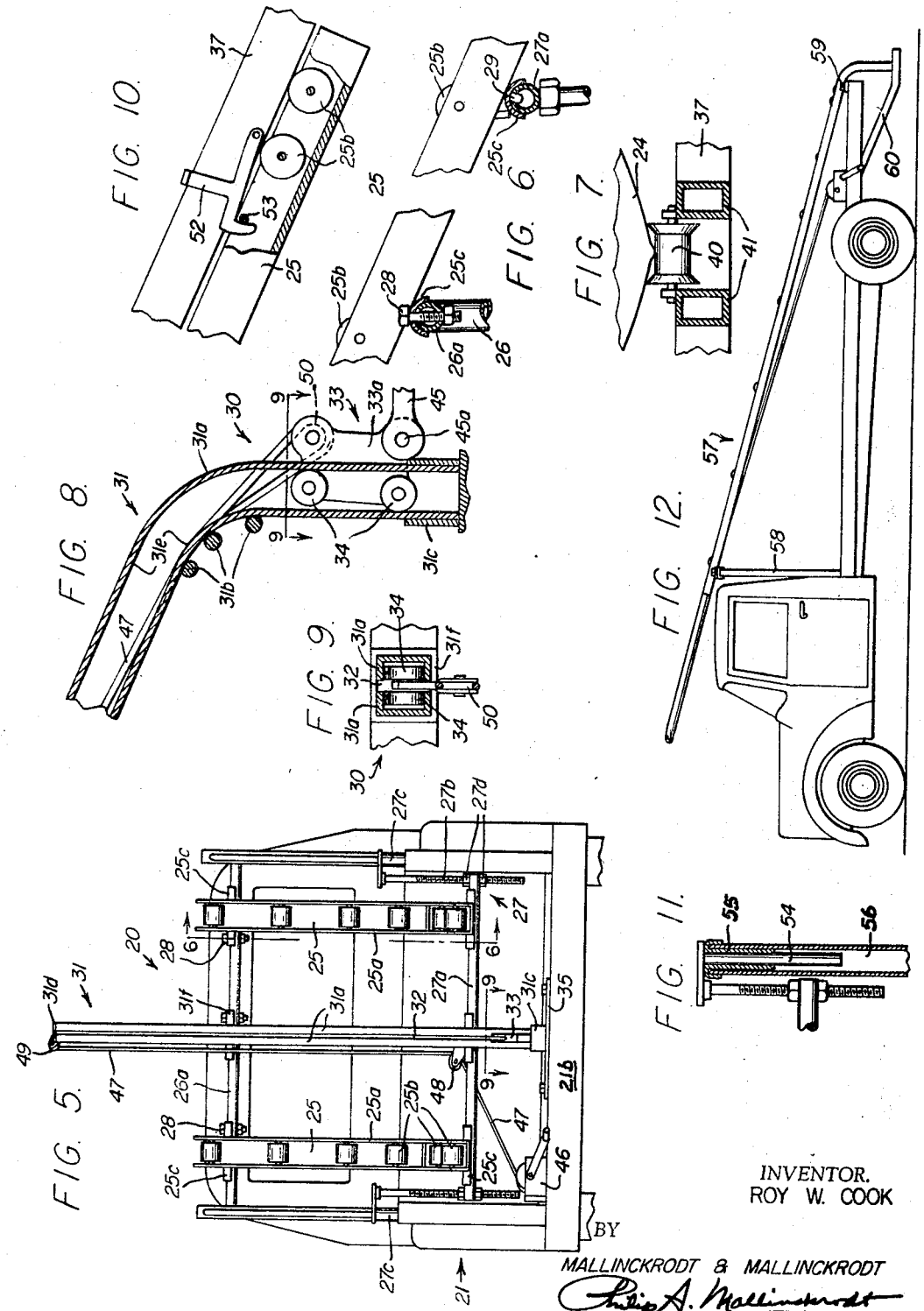

United States Patent Office 3,411,644
Patented Nov. 19, 1968

3,411,644
BOAT LOADER AND CARRIER
Roy W. Cook, Green River, Utah, assignor to Duchess Corporation, Green River, Utah, a corporation of Utah
Filed July 7, 1966, Ser. No. 563,421
16 Claims. (Cl. 214—450)

ABSTRACT OF THE DISCLOSURE

A boat loader and carrier for hoisting small boats onto trucks and for lowering such boats from the trucks. A sloping trackway is provided for secure placement on the load-carrying portion of a truck, and a rear-wheeled boat carrier is mounted for longitudinal forward movement onto and backward movement from the trackway. The trackway structure is provided with a longitudinally extending rail that serves to retain a trolley assembly to which the forward end of the boat carrier is adapted to be articulatively attached. A winch that may be either manually or power operated is provided for pulling the boat carrier onto the trackway and for lowering it therefrom.

---

This invention relates to apparatus for loading and unloading boats for transport over land, and relates also to transport carriers for the boats.

Pick-up trucks and flat bed trucks are often used to tow boat trailers, especially by boat dealers who must transport boats purchased from factories or distributors. Sportsmen also often use trucks to tow boat trailers.

In the making of the present invention, it was realized that it would be desirable for these boat dealers to be able to carry one boat on the truck while carrying another on the boat trailer, and that a sportsman could pull a house trailer for living at a campsite if the boat could be carried on the truck. Moreover, it was realized that there might be truck owners who would prefer not to have to purchase a boat trailer for transporting a boat, or that there might be persons who would prefer not to have the inconvenience of towing any kind of a trailer back of a truck.

In accordance with the invention, it is now possible to safely and securely carry a boat on a truck and for one man to conveniently load it for transport and to unload it and to launch it, if desired, following transport. It is also possible to conveniently place the boat for storage over periods of non-use and to tow it on its carrier over short distances without the necessity of loading it for transport.

A feature of the invention is the provision of a rear-wheeled boat carrier for extension onto the ground or into shallow water from a sloping trackway adapted for secure placement on the load-carrying portion of the truck. A winch is advantageously provided for pulling the boat onto the carrier, although loading may be accomplished in any manner desired. A winch and cable system affording requisite mechanical advantage is provided for pulling the boat-carrying carrier onto the trackway and for gently lowering it therefrom.

In order to accommodate shifting movements of the boat carrier and to provide effective support therefor as it is being raised or lowered during its travel along and its brief cantilever relationship with the trackway before touching or after leaving ground, a central rail and retained trolley assembly is provided. The forward end of the boat carrier is articulatively attached to the trolley by a connection affording both horizontal and vertical movement.

When the apparatus is being used with a pick-up truck, it is advantageous that a convertible rack of the type disclosed in my U.S. Patent No. 3,029,101 of Apr. 10, 1962 be employed. This provides horizontal structure at the forward end of the load-receiving bed of the truck for receiving and supporting the trackway portion of the apparatus and accommodates special height-adjustable horizontal structure at the rear end of such bed for the same purpose. Otherwise, and in the case of a flat-bed or other type of truck, it is necessary to provide appropriate horizontal structure at forward and rearward ends of the truck bed.

Positive locking of the boat carrier to the sloping trackway in the retracted, transport position of carrier on trackway is preferably provided for by some suitable means, such as a hook latch and bar keeper therefor, to supplement the conventional lock on the carrier-loading winch.

In instances where it is desired to attach a short-tongued trailer to the boat-loaded truck, especially where a large outboard motor is mounted on the boat, an optional feature of the invention is the provision of a tongue-formed extension coupling between a standard trailer hitch on the truck and the short tongue of the trailer, thereby enabling the boat loading and carrying apparatus of the invention to be conveniently utilized.

There are shown in the accompanying drawings several embodiments of apparatus representing the best mode presently contemplated of carrying out the inventive concepts in actual practice.

In the drawings:

FIG. 1 represents a side elevation of a pick-up truck equipped with my patented convertible rack and with boat loading and carrying apparatus conforming to this invention, the wheeled carrier being fully extended to ground position and shown with a boat thereon;

FIG. 2, a view corresponding to that of FIG. 1 but drawn to a larger scale, with portions broken away for convenience of illustration and with the boat carrier in fully retracted position on the trackway structure, ready for transport;

FIG. 3, a top plan view drawn to the same scale as FIG. 2, but showing only the trackway structure as installed on the truck;

FIG. 4, a similar view showing only the boat carrier as fully extended in ground position without the boat;

FIG. 5, a rear elevation of the truck with trackway structure, as shown in FIG. 3;

FIG. 6, a fragmentary, longitudinal, vertical section taken along the line 6—6 of FIG. 5 and drawn to a somewhat larger scale;

FIG. 7, a fragmentary, transverse, vertical section taken along the line 7—7 of FIG. 4, and drawn to the same scale as FIG. 6;

FIG. 8, a fragmentary, longitudinal, vertical section taken along the line 8—8 of FIG. 3, and drawn to the same scale as FIGS. 6 and 7 to show details of the trolley and its retained mounting in the central rail of the trackway structure, a portion of the articulative coupling for the boat carrier being shown attached to the trolley;

FIG. 9, a fragmentary, transverse, horizontal section taken along the line 9—9 of FIG. 8 (also indicated in FIG. 5);

FIG. 10, an enlarged view of that fragmentary portion of FIG. 2 that is enclosed by the broken line 10, with exterior structure broken away to reveal otherwise hidden portions of hook latch and bar keeper locking means between boat carrier and trackway structure;

FIG. 11, a fragmentary view corresponding to the right-hand portion of FIG. 5, but drawn to a larger scale and showing modified height-adjustable structure for receiving and supporting the rear end of the trackway structure in instances where it is desired to transport very wide boats;

FIG. 12, a view corresponding to the left-hand portion of FIG. 1, but showing how trackway structure conforming to the invention is mounted on a flat-bed truck;

FIG. 13, a top plan view of a tongue-formed coupling for use between a truck with trailer hitch and a short-tongued trailer;

FIG. 14, a side elevation;

FIG. 15, a fragmentary top plan view drawn to a considerably reduced scale and showing a truck equipped with boat loading and carrying apparatus of the invention coupled to a short tongued trailer by means of a tongue-formed coupling of FIGS. 13 and 14; and FIG. 16, a side elevation corresponding to FIG. 15.

Referring to the drawings:

The apparatus of FIGS. 1–10 comprises trackway structure 20 securely mounted on a standard pick-up truck 21, which is equipped with a convertible rack 22 as disclosed in my afore-referred to U.S. Patent No. 3,029,101. It also comprises a boat carrier 23, shown in FIGS. 1, 2, and 7, as carrying a boat 24.

In its illustrated form, the trackway structure 20 comprises roller tracks 25 at respectively opposite sides of the truck bed and extending longitudinally of the truck bed 21a, between a forward end frame 26, FIGS. 1 and 2, of the rack 22 and a height-adjustable rear end frame 27, FIGS. 1 and 5, of such rack.

Each roller track 25 is advantageously made up of a structural steel channel 25a of rollers 25b rotatably mounted in the channel bed at intervals along the length thereof and on respective shafts journaled in the upstanding legs of the channels. For quiet riding, it is advantageous that these rollers be of rubber or rubber-like material. Each channel has welded to its underside and at respectively opposite ends thereof downwardly-concave mounts 25c, which are conveniently provided by longitudinally split, short lengths of pipe whose inside diameters mate with the outside diameters of pipes forming cross-members 26a and 27a of the forward and rear end frames 26 and 27, respectively. Readily installed and removed bolts 28, FIGS. 5 and 6, serve to rigidly secure the respective tracks in place after slanted pins 29, FIG. 6, are seated in receiving holes in the rear and lowermost cross-member 27a.

In order to adjustably cradle boats of different shapes and sizes, rear end frame 27 is provided with threaded shanks 27b, FIG. 5, that depend from stub mounting stakes 27c in offset relationship therewith, and the cross-member 27a has its ends secured between respective pairs of adjustment nuts 27d, which are threaded on the upright members 27b, respectively.

The trackway structure 20 also comprises a central rail and retained trolley assembly 30, FIG. 5, whose rail 31 is advantageously of elongate box construction comprising mutually spaced, structural steel channels 31a that are secured together at the bottom, as by means of bars 31b, and at their ends as by means of collar 31c and plate 31d, respectively, with their sets of legs directed toward each other to define an open, longitudinal slot 32 along the top of the rail, through which extends and along which travels a protrusive portion 33a of a trolley 33. The main portion of trolley 33 mounts pairs of trolley wheels 34, FIG. 9, inside the rail 31. Sets of these wheels ride in and are retained by the channels 31a, respectively, the individual wheels bearing against first one set of upper or lower rail surfaces 31e, FIG. 8, provided internally of the rail by the channel legs, and then the opposite set, as may be required for proper running support. The collar 31c at the lower end is secured, as by welding, to a plate 35 that rests on and is bolted to the rear bumper 21b of truck 21, see FIGS. 2 and 5, it being noted that the lower end portion of the rail is substantially vertical and curves into the sloping upper portion of the rail.

Both the roller tracks 25 and the central rail and retained trolley assembly 30 are independently installed and removed from the truck as desired, the rail 31 being advantageously equipped with mounts 31f, FIGS. 3 and 5, for bolting to the end frame cross-members much the same as are the roller tracks 25.

The boat carrier 23 is constructed for receiving and carrying a boat, as, for example, the boat 24 equipped with an outboard motor 36. It is also constructed to ride onto and off trackway structure 20 as installed in inclined position on a truck, such as the pick-up truck 21. In the form shown, it comprises a boat-receiving and carrying framework 37 supported at the rear by wheels 38 or the like and having a tongue 39 extending forwardly for connection with the protruding portion 33a of trolley 33.

Framework 37 may be of any desired construction similar to the bed of a boat trailer. As shown, it is provided with a central trackway comprising a series of rollers 40, FIG. 4, journaled between longitudinal members 41 in mutually spaced relationship along the length thereof. The rollers are preferably of rubber or rubber-like material and configurated to receive the keel of a boat. A usual type of padded, stabilizing support 42 for the boat bottom is provided at the rear of the framework, and a conventional winch 43 is mounted on an upright support 44 that rises from tongue 39 at the forward end of the framework, see FIGS. 1 and 2. The boat is pulled onto the framework 37, i.e. the bed of the carrier 23, by means of the winch 43 in conventional manner.

A coupling 45, that articulates on both vertical and horizontal axes, is used to connect the forward end of tongue 39 to the protrusive portion 33a of trolley 33. It is desirably permanently fastened to one or the other of the connecting members, and is temporarily attached to the other, as by means of a removable pin such as that shown at 45a.

Boat carrier 23 is pulled onto and lowered from trackway structure 20 by means of a winch system, which includes a winch 46, FIG. 5, conveniently mounted on truck bumper 21b and having a cable 47 that passes under a sheave 48 mounted on rail 31, extends to and passes around a sheave 49 mounted on and projecting from plate 31a at the upper end of the rail, extends downwardly internally of the rail, FIG. 8, and passes around a sheave 50 journaled in the protrusive portion 33a of trolley 33, and extends, internally of the rail, back up to an anchorage 51, FIG. 3, at the upper end of the rail.

Although the winch 46 is normally provided with a locking device of conventional type, it is desirable to provide positive locking means between carrier 23 and its receiving trackway structure 20. In the illustrated instance, this takes the form of latch hooks 52, see especially FIG. 4, pivoted to opposite sides of framework 37 and adapted to engage respective keeper bars 53, FIG. 3, extending between the upstanding legs of the structural channels 25a that are component to roller tracks 25.

It is only necessary to operate winch 46, which is shown as being manually operable but which may be powered if desired, to lift the forward end of the boat carrier 23 and pull such carrier, with its loaded boat, onto and up the trackway structure 20 to the retracted transport position shown in FIG. 2 from the extended position shown in FIG. 1, whereupon latch hooks 52 will be swung downwardly to engage keeper bars 53. Lowering of the carrier 23 is accomplished by operating winch 46 in reverse after disengaging the latch hooks from their keeper bars.

Trackway structure 20 is quickly and easily installed on and removed from the truck. Thus, the truck can be used for general haulage or passenger purposes as required and quickly converted for boat transport when desired. Moreover, the bed of the truck is reasonably free and capable of use for general transport purposes, as, for example, to carry boat accessories, camping supplies, etc., even when the boat loading and carrying apparatus of the invention is in operable placement on the truck. It should also be noted that the streamlined prow of the boat being carried presents little wind resistance during transport and makes for stability during transport.

In instances where the boat is very wide, as is often the case, the upward protrusion of rear posts 27c of the rack 22 may come dangerously close to the boat and present an obstacle to loading and unloading. Accordingly, it is preferred to construct the rear end frame 27 of rack 22 as shown in FIG. 11, wherein the posts 27c are replaced by posts 54 and sleeves 55 that are both substantially wholly received within stake pockets 56 of the truck, with their upper ends substantially flush with the upper ends of the stake pockets. This has been found to eliminate any difficulty with boats of large size.

As indicated in FIG. 12, embodiments of the invention, such as that shown at 57, can be constructed for use with other types of trucks, for example flat-bed trucks normally having no provision for a convertible rack, such as is shown at 22 in the preceeding figures of the drawings. It is only necessary to provide a front supporting structure 58, if none is already present, and a rear support 59. If no rear bumper is present, a platform member, such as 60 can be easily welded or otherwise fastened to the rear end of the bed of the truck for receiving and supporting the lower end of the rail of the trackway structure.

Illustrated in FIGS. 15 and 16 is a tongue-formed extension coupling 61 attaching a short-tongued trailer 62 to a boat-loaded truck 63, the coupling being shown per se in FIGS. 13 and 14.

As shown, the coupling 61 is a frame or V-tongue configuration having a standard ball hitch connector 64 at its apex and a standard ball hitch 65 rising centrally from a transverse member 61a that is located intermediate the length of the frame and that connects backwardly divergent frame members 61b. The rear ends of such tongue members at the divergent end of the coupling 61 are advantageously curved outwardly, as at 61c, to better enable the coupling to fit a variety of types of short, trailer, U-tongues, see 66.

In installing a coupling 61, the ball hitch connector 67 of the short, trailer, V-tongue 66 is attached to the ball hitch 65 of the coupling in customary manner, and the end portions 61c of the respective tongue members 61b are securely fastened to the corresponding tongue members of the trailer tongue 66, as by means of respective U-bolts 68. Thereupon, the ball hitch connector 64 of the coupling 61 is attached to the ball hitch 69 on the trucks.

Whereas this invention is here described and illustrated with respect to certain forms thereof, it is to be understood that many variations are possible without departing from the subject matter particularly pointed out in the following claims, which subject matter I regard as my invention.

I claim:

1. Boat loading and carrying apparatus for trucks, comprising
   trackway structure adapted for removable securement on the bed of a truck, sloping upwardly from the rear to the front of the truck bed and including tracks at opposite lateral sides of said structure and a rail and retained trolley assembly between said tracks;
   a boat carrier adapted to be received by and to travel along the tracks of said trackway structure for loading and unloading a boat with respect to the truck, said boat carrier having wheels at its rear end and a tongue at its forward end;
   an articulative coupling for connecting the tongue of the boat carrier to the retained trolley, said coupling having both horizontal and vertical axes of articulation; and
   a winch system for pulling the trolley and its coupled load upwardly and for restrained lowering of the trolley and its coupled load along the rail.

2. A boat loading and carrying apparatus for trucks according to claim 1, wherein the tracks of the trackway structure each includes a series of rollers rotatable on respective axes that extend transversely of the rail, said rollers being adapted to receive and support the boat carrier.

3. A boat loading and carrying apparatus for trucks according to claim 1, wherein the rail has a substantially vertical portion at its lower end curving into a sloping upper portion.

4. A boat loading and carrying apparatus for trucks according to claim 1, wherein the rail of the trackway structure is of elongate box construction having an open slot extending longitudinally along its top and upper and lower rail surfaces internally thereof laterally of said slot; and wherein the trolley has a portion internally of said rail journaling trolley wheels adapted to bear against and ride along said rail surfaces, and a protrusive portion adapted to connect with the articulative coupling.

5. A boat loading and carrying apparatus for trucks according to claim 1, wherein the winch system includes a winch; sheaves journaled at the upper end of the rail and on the protrusive portion of the trolley, respectively; and a cable extending from the winch, passing around the sheave at the upper end of the rail, extending downwardly internally of the rail to the trolley, passing around the sheave on the trolley, and passing upwardly internally of the rail to an anchorage at the upper end of the rail.

6. A boat loading and carrying apparatus for trucks according to claim 1, wherein there are included mounting structure for the trackway structure, comprising a forward end frame adapted for secure attachment to the truck and a height-adjustable rear end frame also adapted for secure attachment to the truck; and means carried by the trackway structure for securing such trackway structure to said mounting structure.

7. A boat loading and carrying apparatus for trucks according to claim 6, wherein the end frames include cross members, and the securing means carried by the trackway structure comprise downwardly concave, transverse members secured to the tracks and to the rail, respectively, at opposite end-portions thereof and adapted to fit over and seat upon said cross members.

8. A boat loading and carrying apparatus for trucks according to claim 6, wherein the height-adjustable rear end frame comprises a pair of mutually spaced mounting stakes; a pair of threaded shanks depending from respective mounting stakes in offset relationship therewith, inwardly of the space therebetween; a cross-bar; and means height-adjustably mounting the ends of said cross-bar on the respective threaded shanks.

9. A boat loading and carrying apparatus for trucks according to claim 1, wherein the track and rail are separate parts, so they can be easily mounted and dismounted independently of one another.

10. A boat loading and carrying apparatus for trucks according to claim 1, wherein positive locking means are provided between the boat carrier and the trackway structure.

11. A boat loading and carrying apparatus for trucks according to claim 1, wherein the boat carrier is provided with a central trackway for the keel of a boat, and with its own winch for pulling a boat thereonto.

12. In combination, an automotive truck having a load-carrying bed; mounting means securely attached to the truck at the forward end of said bed and transversely thereof; second mounting means of less height than the first mounting means and securely attached to the truck at the rear end of said bed and transversely thereof; and boat loading and carrying apparatus according to claim 1, having its trackway structure fastened to said mounting means.

13. A combination according to claim 12, additionally including a trailer hitched to the truck for towing thereby.

14. A combination according to claim 13, wherein the trailer has a short tongue, and there is additionally provided a tongue-formed extension coupling articulatively interconnecting the short tongue of the trailer with the truck.

15. A combination according to claim 14, wherein the trailer tongue is of V configuration with its apex forward and provided with a ball hitch connector; the tongue-formed extension coupling is of V configuration with its apex forward and provided with a ball hitch connector; a ball hitch is mounted on the said extension coupling intermediate the forward and rear ends thereof, the ball hitch connector of the trailer tongue being in engagement therewith; a ball hitch is mounted at the rear end of the truck, the ball hitch of said extension coupling being in engagement therewith; and there are removable means securing the wide rear end of said extension coupling to a corresponding wide portion of the trailer tongue.

16. A combination according to claim 15, wherein the rear ends of the legs of the V configurated extension coupling are turned outwardly so as to project laterally of the normal width of the V configuration.

References Cited

UNITED STATES PATENTS

| | | | |
|---|---|---|---|
| 2,808,952 | 10/1957 | Nicholas | 214—450 |
| 3,128,893 | 4/1964 | Jones | 214—450 |
| 3,170,583 | 2/1965 | Meyer | 214—450 |
| 3,343,696 | 9/1967 | Morrison | 214—450 |

FOREIGN PATENTS

| | | |
|---|---|---|
| 445,931 | 4/1936 | Great Britain. |

ALBERT J. MAKAY, *Primary Examiner.*